United States Patent
Maj et al.

(10) Patent No.: US 8,567,833 B2
(45) Date of Patent: Oct. 29, 2013

(54) BLADE LIFTING SYSTEM WITH SALOON DOORS

(75) Inventors: Karl Aage Maj, Hammel (DK); Bjarne Soerensen, Ejby (DK)

(73) Assignee: Siemens Aktiengesellschaft, München (DE)

( * ) Notice: Subject to any disclaimer, the term of this patent is extended or adjusted under 35 U.S.C. 154(b) by 7 days.

(21) Appl. No.: 13/265,195

(22) PCT Filed: Jul. 7, 2009

(86) PCT No.: PCT/EP2009/058537
§ 371 (c)(1), (2), (4) Date: Jan. 6, 2012

(87) PCT Pub. No.: WO2010/124744
PCT Pub. Date: Nov. 4, 2010

(65) Prior Publication Data
US 2012/0098283 A1    Apr. 26, 2012

Related U.S. Application Data

(60) Provisional application No. 61/173,646, filed on Apr. 29, 2009.

(51) Int. Cl.
*B66C 1/00* (2006.01)
(52) U.S. Cl.
USPC ....................................... 294/67.32; 294/67.1
(58) Field of Classification Search
USPC .................... 294/67.32, 81.52, 67.1
See application file for complete search history.

(56) References Cited

U.S. PATENT DOCUMENTS

| | | | | |
|---|---|---|---|---|
| 1,148,679 | A * | 8/1915 | Hoffer | 81/462 |
| 3,424,488 | A * | 1/1969 | Renfroe | 294/67.32 |
| 8,360,398 | B2 * | 1/2013 | Diaz De Corcuera et al. | 254/131 |
| 8,366,360 | B2 * | 2/2013 | Krogh et al. | 410/44 |
| 2007/0177954 | A1 * | 8/2007 | Kootstra et al. | 410/44 |
| 2007/0266538 | A1 | 11/2007 | Bervang | |
| 2008/0006806 | A1 * | 1/2008 | Hall et al. | 254/362 |
| 2010/0018055 | A1 * | 1/2010 | Lynderup et al. | 29/889 |
| 2011/0185571 | A1 * | 8/2011 | Maj et al. | 29/889 |
| 2012/0025552 | A1 * | 2/2012 | Echarri Latasa et al. | 294/67.31 |
| 2012/0192420 | A1 * | 8/2012 | Krogh et al. | 29/889 |
| 2012/0201648 | A1 * | 8/2012 | Salthaug | 414/814 |

FOREIGN PATENT DOCUMENTS

| | | |
|---|---|---|
| EP | 1925583 A1 | 5/2008 |
| WO | WO 2005071261 A1 | 8/2005 |
| WO | WO 2008132226 A1 | 11/2008 |
| WO | WO 2009112887 A1 | 9/2009 |

* cited by examiner

*Primary Examiner* — Saul Rodriguez
*Assistant Examiner* — Gabriela Puig

(57) ABSTRACT

A system for lifting a blade of a wind turbine is proposed. The system includes a yoke device lifted by a crane, an upper bracket device and a lower bracket device that are mounted to the yoke device for holding the blade. The upper bracket device engages a first section of the blade and the lower bracket device engages a second section of the blade. The lower bracket device is movably mounted to the yoke device in such a way that the blade is insertable into the system in an open position of the lower bracket device. The lower bracket device is movably mounted to the yoke device in such a way that the blade is spatially fixed by both the upper bracket device and the lower bracket device in a closed position of the lower bracket device.

12 Claims, 3 Drawing Sheets

BLADE LIFTING SYSTEM WITH SALOON DOORS

CROSS REFERENCE TO RELATED APPLICATIONS

This application is the US National Stage of International Application No. PCT/EP2009/058537, filed Jul. 7, 2009 and claims the benefit thereof. The International Application claims the benefits of U.S. application No. 61/173,646 filed Apr. 29, 2009, both of the applications are incorporated by reference herein in their entirety.

FIELD OF THE INVENTION

The present invention relates to a system for lifting a blade of a wind turbine and a method of lifting a blade of a wind turbine with the system.

BACKGROUND OF THE INVENTION

Today, the blades of wind turbines become larger and larger and are mounted to a hub mounted on a high wind turbine tower in order to provide a better efficiency. When a blade has to be dismounted and removed from an existing wind turbine, e.g. due to a failure or defect in the blade or for maintenance reasons, it is conventionally done by using a crane with a yoke, wherein the yoke comprises webbing slings that are mounted around the blade. The webbing slings have to be mounted by hand by a person. Thus, this person has to be lifted up to the blade in a basket to mount the webbing slings around the blade. This may be quite time-consuming and expensive as a separate crane is needed to lift up the person to mount the webbing slings around the blade and the yoke is hold in a fixed position with respect to the blade by another crane.

EP 1 925 583 A1 discloses such a method of handling wind turbine blades and a device for mounting wind turbine blades. Belts that are mounted to a yoke were clamped around the blade for fixing the blade to be demounted. The belt has to be mounted in hand by a person lifted up in a basket by separate crane to the blade.

SUMMARY OF THE INVENTION

It may be an object of the present invention to provide a proper system for lifting a blade of a wind turbine.

The object is solved by a system for lifting a blade of a wind turbine and by a method of lifting a blade of a wind turbine with the system as described in the independent claims.

According to a first exemplary embodiment of the present invention a system for lifting a blade of a wind turbine is described. This system comprises a yoke device adapted for being lifted by a crane, an upper bracket device and a lower bracket device. The upper bracket device and the lower bracket device are mounted to the yoke device for holding the blade. The upper bracket device is adapted for engaging a first section of the blade. The lower bracket device is adapted for engaging a second section of the blade. The lower bracket device is movably mounted to the yoke device in such a way that the blade is insertable into the system in an open position of the lower bracket device. Moreover, the lower bracket device is movably mounted to the yoke device in such a way that the blade is spatially fixed by both the upper bracket device and the lower bracket device in a closed position of the lower bracket device.

According to a further exemplary embodiment a method of lifting a blade of a wind turbine with the above-described system is described. According to the method, a lower bracket device that is mounted to a yoke device is moved into an open position for inserting the blade into the system. A first section of the blade is spatially fixed by the upper bracket device mounted to the yoke device. The lower bracket device is moved into a closed position for spatially fixing a second section of the blade by the lower bracket device, so that the blade is held both by the upper bracket device and the lower bracket device.

The term "yoke device" denotes a carrier or a framework that is adapted for being lifted by a crane on the one side and on the other side that is adapted to support the upper bracket device and the lower bracket device. The yoke device may comprise a cross beam in a particularly horizontal orientation, wherein from the cross beam pillars may extend in a substantially orthogonal direction from the cross beam and/or a substantially vertical direction. The yoke device may comprise a further cross beam that is connected to the cross beam by longitudinal beams.

The term "bracket device" may denote a bracket assembly that may comprise an inner (clamping) profile that may fit to a shape or profile of the first/second section of a blade in order to provide a form fit connection or clamping connection with the blade.

The terms "upper" bracket device and "lower" bracket device denote bracket devices that spatially fix the first section of a blade and/or the second section of the blade, e.g. the trailing edge of the blade and/or the leading edge of the blade or vice versa. The "lower" bracket device may be mounted movably to the yoke device. The terms "upper" and "lower" may denote a vertical position with respect to the yoke device. Besides that, in exemplary embodiments, the upper bracket device and the lower bracket device may change its positions with respect to the yoke device. In other words, the upper bracket device may be movably fixed to the yoke device and the lower bracket device may statically fixed to the bracket device.

The term "open position" may denote a position of the lower bracket device, in which position the blade to be lifted may be inserted into the system. In other words, the system may be moved over the blade in order to engage or envelope the blade. The term "closed position" may denote a position of the lower bracket device, in which position the blade is spatially fixed to the system e.g. by a clamping connection.

The term "movably" may denote a movable connection with a yoke device in such a way that the lower bracket device may be for instance pivotable or may be movable in a longitudinal direction along a part or a pillar of the yoke device. The lower bracket device may for instance be movable in a longitudinal direction and to (in the close position) and away (in the open position) from the upper bracket device, so that the blade device may be insertable in the open position of the lower bracket device and fixed in the closed position of the lower bracket device. In particular, when the lower blade device moves in the direction to the upper bracket device in the closed position, the upper bracket device and the lower bracket device may spatially fix the blade for instance by a clamp connection.

The terms "first section" and "second section" of the blade device may denote different sections or portions of the blade. E.g. the first section and/or the second section may be the a region comprising the trailing edge, a region comprising the leading edge, a region comprising an upper surface or a region comprising lower surface of the blade.

By the present invention, the upper bracket device may be fixed to the yoke device in a stationary way while the lower bracket device is movably, e.g. pivotably and/or displaceable or slidingly connected to the yoke device. The system may be moved the blade in particular by a crane and secured by the stationary upper bracket device and the movably lower bracket device that may be controlled for instance by a remote control. In the open position of the lower bracket device the system may be moved over a blade to be lifted. When the lower bracket device is moved in the closed position, the blade may be clamped between the upper bracket device and the lower bracket device. The lower bracket device pulls itself up against the blade with a pull force, for example. Thus, it is possible to dismount or mount a blade from or to the hub of a built on and existing wind turbine on site without the need of manually adjusting lifting means. In particular, no belts or webbing slings may be necessary that have to be pulled around the blade manually. Furthermore, only one crane may be necessary for lifting the yoke of the system. Moreover, no workers have to be jeopardised to attach for instance the belts around an installed blade. Thus, a fast, inexpensive and safe lifting system for a wind turbine blade may be provided.

According to a further exemplary embodiment, the yoke device comprises a pillar, wherein the lower bracket device is mounted movably to the pillar. The yoke device may comprise a cross beam that is oriented in a horizontal direction wherein on each end of the cross beam the pillar may extend in a vertical direction, in particular orthogonal to the cross beam. To the cross beam or to the pillar the upper bracket device may be attached stationary, wherein the lower bracket device is mounted movably e.g. to an end region of the pillar. When the lower bracket device is movably along the pillar or is pivotably mounted to the pillar, the lower bracket device may easily be moved into its open or closed position, so that the blade may be moved into the system.

According to a further exemplary embodiment the lower bracket device is mounted slidably along the pillar.

According to a further exemplary embodiment, the yoke device comprises a further pillar. The lower bracket device comprises a first lower bracket element and a second lower bracket element. The first lower bracket element is pivotably mounted to the pillar and the second lower bracket element is pivotably mounted to the further pillar.

The pillar may be mounted to a first end section of the cross beam of the yoke device and the further pillar to a opposed end section of the cross beam. Thus, the blade may be inserted between or within the pillar and the further pillar. The pillar and/or the further pillar may also be mounted movably to the cross beam, so that the pillar and the further pillar may be moved along the cross beam of the yoke device for reducing or enlarging its distance. Thus, the system may be adapted to different sizes of different blades by adjusting the movable pillars.

Moreover, the lower bracket device may be separated in a first half, namely the first lower bracket element, and a second half, namely the second lower bracket element. Each of the first and second lower bracket elements may be pivotably mounted to the pillar, so that the lower bracket element may provide the open position when pivoting the first and second lower bracket elements. In the open position of the system, the yoke device may provide an open profile such as a profile of an inverted U-shape wherein the blade element may be inserted from the open side into the system. The pillars form the sidewall and the cross beam the base area of the U-shape. In other words, the blade needs not to be moved or slid horizontally into the system but may be moved vertically into the system, so that the system envelopes the blade.

According to a further exemplary embodiment, the system comprises a safety pin. The safety pin is adapted for fixing the first lower bracket element and the second lower bracket element in the closed position. The safety pin is detachable from the first lower bracket element or the second lower bracket element in the open position. In other words, the first lower bracket element or the second lower bracket element may comprise a lock or a hook in which the safety pin may be engaged. A mechanical system may move the safety pin in or out of the hook. In particular, when the lower bracket device is in the closed position, the safety pin is moved into the hook for fixing the first lower bracket element and the second lower bracket element together. When the lower bracket device is moved in the open position, first of all the safety pin moves out of the hook, so that the first lower bracket element and the second lower bracket element are released and unlocked. Thus, an incorrect releasing or opening of the lower bracket device may be prevented by the safety pin. The safety pin may be controlled by an actuator, for example.

According to a further exemplary embodiment, the lower bracket device comprises a bracket connection element. The pillar (and/or the further pillar) comprises a pillar connection element. The bracket connection element is slidably and pivotably mounted to the pillar connection element. A sliding motion and/or a pivotal motion of the bracket connection element with respect to the pillar connection element are correlated with each other by a pin engaging in a guiding slot. By the present exemplary embodiment an easy incomplex controlling mechanism may be provided for opening and closing the lower bracket element. The bracket connection element and the pillar connection element form an interface between the lower bracket device and the pillar. The bracket connection element and the pillar connection element may be formed of cylinders wherein each cylinder is engageable with each other.

In particular, the bracket connection element may comprise an inner cylinder that may be inserted into an outer cylinder of the pillar connection element. One of the bracket connection element and the pillar connection element may comprise a pin that extends into the direction to the other part of the bracket connection element and/or the pillar connection element. The other one of the bracket connection element or pillar connection element may comprise a guiding slot that defines a certain sliding direction of the pin and thus a predetermined guiding direction between the bracket connection element and the pillar connection element. In other words, the pin may be slidably engaged in the guiding slot. When exerting a driving force to the bracket connection element in a vertical direction, the bracket connection element moves vertically along the pillar connection element. When the guiding slot extends vertically, the bracket connection element moves also vertically along the pillar connection element. When the guiding slot starts to extend in a helical, rather horizontal trace, the pin follows the helical trace of the guiding slot, so that the bracket connection element and thus the lower bracket device also follows the helical direction and thus pivots around the pillar. Thus, the lower bracket device may be moved in an open position by a longitudinal and/or pivotable motion, depending on the trace of the guiding slot.

By the above described opening/closing mechanism, only a driving force is necessary that is exerted in one force direction. In particular, when a driving force is exerted to the bracket connection element in a longitudinal, rather vertical direction, e.g. parallel to the pillar, a longitudinal motion of the lower bracket device may be provided. When the guiding slot extends helically, also a pivotal movement of the lower bracket device may be caused although the same driving force is exerted. Thus, complex and expensive driving mechanism may be obsolete.

According to a further exemplary embodiment, the upper bracket device and/or the lower bracket device is/are detachably mounted to the yoke device. Thus, when an upper or the lower bracket device is defect, an easy exchangeability may be provided without exchanging the complete system. Moreover, the upper and lower bracket devices may be adapted to different shapes of the blades, so that the system may be used for a large variety of different shaped and sized turbine blades.

According to a further exemplary embodiment, the system comprises a controller and an actuator. The actuator is mounted to the yoke device. The actuator is adapted for driving the lower bracket device, wherein the controller is adapted for controlling the actuator. The actuator may be a hydraulic, electric or combustion engine that is adapted for operating and for moving respectively the lower bracket device from its open to its closed position and vice versa.

According to a further exemplary embodiment, the controller is mounted to the yoke device and the controller is adapted for being remote controlled. The controller may be a processor unit, for instance, that is mounted to the yoke device. From the ground, the controller may be remote controlled by a person, so that there is no need that a person has to be placed in the vicinity of the actuator on the yoke device for controlling the actuator. Thus, when demounting a blade, no person has to be placed in the vicinity of the blade for controlling the demounting respectively the lifting of the blade. The person may be safely positioned on the ground for controlling the system.

According to a further exemplary embodiment, the system further comprises a sensor, wherein the sensor is adapted for sensing a relative position of the yoke device, the upper bracket device and/or the lower bracket device with respect to the blade. Thus, a damage due to an incautious movement of the system may be prevented because the sensor may warn the controller respectively the operator when a certain distance between the system parts and the blade is too small. The sensor may be an infrared sensor or a laser sensor, for example. Moreover, the system respectively the yoke device may be operated automatically with respect to the input of the sensor. In particular, when the sensor senses a predetermined small distance between the system and the blade, the sensor may send operating instructions to the controller, so that the controller automatically controls the actuator for moving the system to a safe position.

According to a further exemplary embodiment, at least one of the lower bracket device and the upper bracket device comprises a shell that is adapted to a shape of a region (e.g. the first section or the second section) of the blade. The shell may comprise for instance a muffling or a damping material, so that damage due to a heavy contact of the lower or upper bracket device with the blade may be provided. When the shell is adapted to the profile or the contour of the blade also the clamp connection between the upper bracket device and the lower bracket device may be improved. Moreover, the shell may be detachable, so that the shell may be adapted to different shapes and sizes of different blades to be lifted.

Thus, the lower and upper bracket devices may be designed for holding the shell, wherein only the shell is adapted to a specific shape of a blade. Thus, when a blade with a different profile has to be transported or lifted, only the shell has to be exchanged wherein the upper and lower bracket devices may still kept installed into the system. Thus, the change over time between the lifting of two different blades may be reduced.

According to a further exemplary embodiment, the system further comprises a further upper bracket device and a further lower bracket device. The further upper bracket device and the further lower bracket device are mounted to the yoke device for holding the blade at the different region of the blade with respect to the upper bracket device and the lower bracket device.

Thus, a second mounting or holding point of the system for the blade may be provided, so that the demounting of the blade may be more secure due to further fixing or holding points along the blade. The further upper bracket device and the further lower bracket device may be mounted to a further yoke device that is separate to the above described yoke device but lifted by one and the same crane. Moreover, the yoke device may comprise a connection beam for providing one yoke device for the further upper bracket device, the further lower bracket device, the upper bracket device and the lower bracket device. Thus, a more rigid system respectively yoke device may be provided.

By the present invention an improved and proper system for lifting a blade of a wind turbine may be provided. The upper bracket device is fixed to the yoke device in a stationary way while the lower part is pivotably and/or displaceably, slidably connected to the yoke device. The lower bracket device may comprise one or more pivotably and displaceable or slidable first and second lower bracket elements that may be also called saloon doors. The controller may be connected to actuators, e.g. motors, and to sensors. The sensor may control the activation of the movement of the saloon doors.

The saloon doors, in particular the first and second bracket elements, may be each pivotably guided and displaced by an activator, e.g. a motor. The actuator may exert a pull or releasing force by using a wire (driving wire) that is connected to an inner cylinder, e.g. the bracket connection element, which is further rigidly connected to a first or second lower bracket element, respectively to one saloon door. The inner cylinder may be slidingly and pivotably connected to an outer cylinder, e.g. the pillar connection element, and thereby providing the pivotable and longitudinal displaceable movement of the inner cylinder and the connected saloon doors.

With the above described system for lifting the blade of the wind turbine the following lifting steps may be provided for lifting a blade. The yoke device with the lower bracket element may be moved in the open position. Next, the yoke device is lower towards the blade until the upper bracket device rests on the first section of the blade, for instance on the trailing edge of the blade. The positioning of the yoke device may be done by a sensor, such as a laser that is mounted for instance to the yoke device and measures the distance between the blade and the yoke device and/or the distance between the yoke device and a hub of the wind turbine or the root end of the blade. Next, the lower bracket device respectively the first and the second lower bracket elements (the saloon doors) may be driven to the closed position by activating an actuator e.g. for each first and second lower bracket element. The actuator may pull or release a wire connected to an inner cylinder (bracket connection element) which is further slidingly and pivotably connected to an outer cylinder (pillar connection element). The motion of saloon doors may be predetermined by e.g. a pin that engages into a guiding slot.

Hooks may be attached to the first and the second lower bracket element, wherein the safety pin may engage into the hooks when the lower bracket device reaches its closed position, i.e. when the first and the second lower bracket elements have finished their rotating or pivoting towards each other. Next, the safety pin may then be pushed forward through each hook of the saloon doors (the first and the second lower bracket elements) by activating the actuator and thereby locking the doors together.

Next, the driving wire of each first and second lower bracket element may be activated again for moving the lower bracket device into the open position. The first and the second lower bracket elements on each side of the yoke device are then pulled up against the blade with a predetermined pull force for generating a clamp fixing.

Next, the blade can be demounted from the hub for instance and lowered by e.g. the crane connected to the yoke device by a further wire in case that the blade is to be demounted. It is also possible to use the system for mounting a blade on a hub. The yoke device may be removed from the blade in a reversed way according to the above described steps.

Instead of pulling or releasing a wire (driving wire) connected between the actuator and the saloon door, i.e. the first or second lower bracket element, an activated threaded spindle may be connected to the first and/or second lower bracket element that could be used to move the first/second lower bracket element in the longitudinal direction and to pivot the first/second lower bracket element in the closed or open position or vice versa.

All parts of the system, i.e. the first or second lower bracket element, the lower bracket device, the upper bracket device, the pillar connection element, the bracket connection element, the shell, the controllers and activators may be detachable attached to the yoke device. Thus, a modularly conception of the system may be provided so that the transport of the system is more incomplex and the system itself is adaptable to a variety of differently shaped blades.

It has to be noted that embodiments of the invention have been described with reference to different subject matters. In particular, some embodiments have been described with reference to apparatus type claims whereas other embodiments have been described with reference to method type claims. However, a person skilled in the art will gather from the above and the following description that, unless other notified, in addition to any combination of features belonging to one type of subject matter also any combination between features relating to different subject matters, in particular between features of the apparatus type claims and features of the method type claims is considered as to be disclosed with this application.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

BRIEF DESCRIPTION OF THE DRAWINGS

In the following, exemplary embodiments of the present invention will be specified for further explanation and for better understanding with reference to the attached drawings.

DETAILED DESCRIPTION OF THE INVENTION

Figure 1:
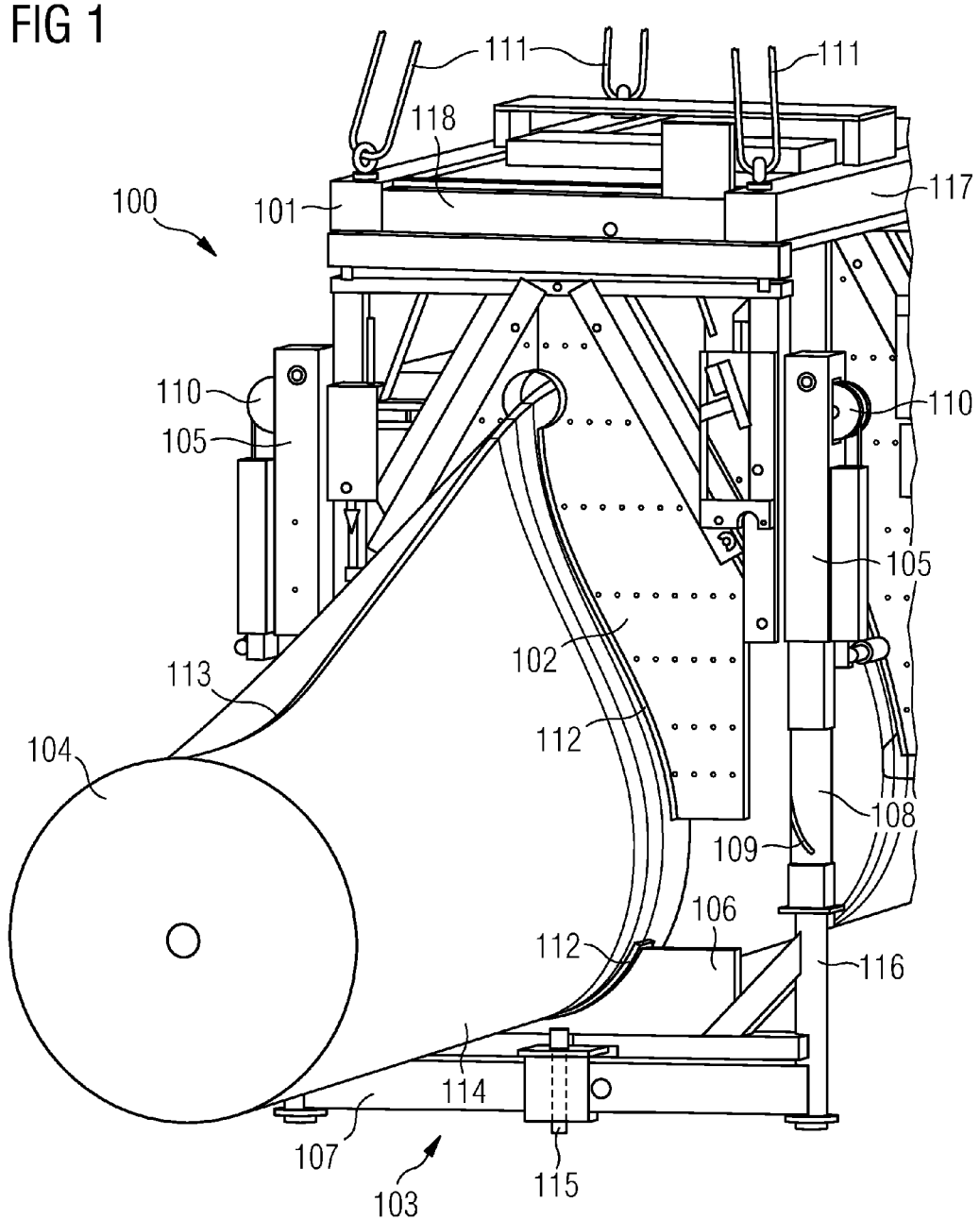
FIG. 1 illustrates a schematical view of the system according to an exemplary embodiment of the present invention.

The illustrations in the drawings are schematically and not fully scaled. Similar or relating components in several figures are provided with the same reference signs.

FIG. 1 illustrates a system 100 for lifting a blade 104 of a wind turbine. The system 100 comprises a yoke device 101 adapted for being lifted by a crane 200. The system 100 further comprises an upper bracket device 102 and a lower bracket device 103. The upper bracket device 102 and the lower bracket device 103 are mounted to the yoke device 101 for holding the blade 104. The upper bracket device 102 is adapted for engaging a first section (e.g. the trailing edge 113) of the blade 104. The lower bracket device 103 is adapted for engaging a second section (e.g. the leading edge 114) of the blade 104. The lower bracket device 103 is movably mounted to the yoke device 101 in such a way that the blade 104 is insertable into the system 100 in an open position of the lower bracket device 103. Moreover, the lower bracket device 103 is movably mounted to the yoke device 101 in such a way that the blade 104 is spatially fixed by both the upper bracket device 102 and the lower bracket device 103 in a closed position of the lower bracket device 103.

By the system 100 for lifting a blade 104 of a wind turbine a proper lifting mechanism for demounting a blade 104 may be provided. The yoke device 101 may comprise a longitudinal beam 117 connected by a cross beam 118 to a further longitudinal beam 117. From the yoke device 101, e.g. from the cross beam 118 (or cross bar), a pillar 105 and a further pillar 105 extends in a vertical direction. To the cross beam 118 or to other locations of the yoke device 101 the upper bracket device 102 may be attached. The upper bracket device 102 may comprise a connection area that provides the same shape or profile as the first section of the blade 104. Moreover, in the contact area to the blade 104, the upper bracket device 102 may comprise a shell 112 that conforms to the shape of the first section of the blade 104. Thus, a proper clamp connection and a proper force transmission from the blade 104 to the upper bracket device 102 may be provided. As may be taken from FIG. 1 the upper bracket device 102 may comprise a plurality of upper bracket parts and the upper bracket device 102 may be detachably fixed to the yoke device 101.

The lower bracket device 103 may provide also a contact area that provides a similar shape as the second section (e.g. the leading edge) of the blade 104 in order to improve the clamp connection with the blade 104. Moreover, the lower bracket device 103 may comprise a shell 112 as well that may be adapted to the shape of the second section of the blade 104.

The lower bracket device 103 may comprise one integral part and in another embodiment as shown in FIG. 1 comprise a first lower bracket element 106 and a second lower bracket element 107. The first lower bracket element 106 may be pivotably mounted to the pillar 105 and the second lower bracket element 107 may be pivotably mounted to the further pillar 105. Moreover, both, the first and the second lower bracket element 106, 107 may be movable longitudinal along the pillar 105 and the further pillar 105. As can be seen in the connection region between the lower bracket elements 106, 107 and the pillars 105, a pillar connection element 108 and a bracket connection element 116 are provided. The pillar connection element 108 may be an outer cylinder. The bracket connection element 116 may be an inner cylinder that may be slidable and pivotable inside the pillar connection element 108. One of the pillar connection element 108 and the bracket connection element 116 may comprise a pin that extends to the other one of the pillar connection element 108 and the bracket connection element 116. The other one of the pillar connection element 108 and the bracket connection element 116 comprises a guiding slot 109 into which the pin may be engaged. Thus, when the pillar connection element 108 and the bracket connection element 116 move relatively to each other, the pin follows the trace of the guiding slot 109. Thus, when the first or second lower bracket element 106, 107 is moved longitudinally along the pillar 105 the pillar connection element 108 and the bracket connection element 116 moves relatively to each other. When the guiding slot 109 provides a curved helical shape, the pin follows the curved, helical shape of the guiding slot 109, so that the first lower bracket element 106 and the second lower bracket element 107 pivots around the pillar 105. Hence, the lower bracket device 103 may be moved into an open position with open saloon doors (i.e. with open first and second lower bracket elements 106, 107) and into a closed position with closed saloon doors.

For providing the above described motion of first lower bracket elements 106 and the second lower bracket elements 107 with the pin/slot 109 connection it may be sufficient to exert a driving force in a longitudinal direction with respect to the pillar 105. Further rotational driving forces for opening or closing the first lower bracket element 106 and/or the second lower bracket element 107 may not necessary.

The bracket connection element 116 may be connected by a driving wire to an actuator 110 that exerts the driving force. Moreover, besides the wire connection also a threaded spindle connection may be provided for exerting the driving force from the actuator to the lower bracket device 103

Moreover, in FIG. 1 a safety pin 115 is shown that connects and safely holds the first lower bracket element 106 and the second lower bracket element 107 in the closed position. The safety pin 115 may be driven by the actuator 110 in order to release and to fix the first lower bracket element 106 and the second lower bracket element 107. The safety pin 115 may be engaged by hooks that are mounted to the first lower bracket element 106 to the second lower bracket element 107.

Moreover, to the yoke device 101 the actuators 110 and the controller 203 may be mounted. The controller 203 and/or the actuator 110 may be remote controlled so that there is no need that an operator has to be placed to the yoke device 101 when operating the system.

Moreover, FIG. 1 illustrates crane connections 111 that are adapted for fixing the yoke device 101 to a crane.

Figure 2:
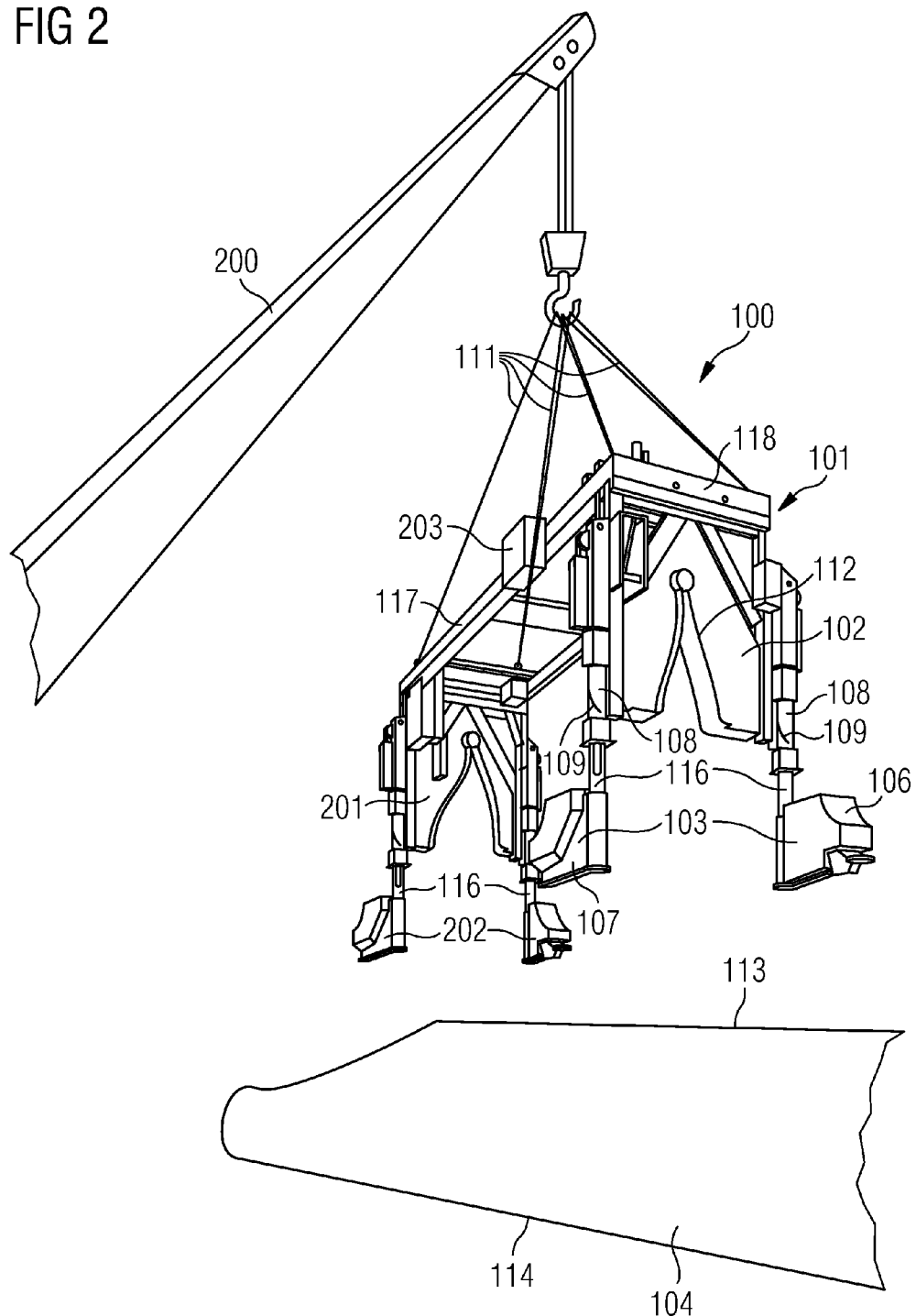
FIG. 2 illustrates a schematical view of a system for lifting a blade wherein the lower bracket device is in an open position according to an exemplary embodiment of the invention.

FIG. 2 illustrates a system 101 wherein the lower bracket device 103 is shown in the open position for engaging the blade 104 and for inserting the blade 104 into the system 100. The blade 104 is positioned in such a way that the trailing edge 113 faces the system 100. The lower bracket device 103 comprises the first lower bracket element 106 and the second lower bracket element 107. The first lower bracket element 106 and the second lower bracket element 107 are in an open position such as an open saloon door.

Moreover, the yoke device 101 provides the cross beam 118 that connects the pillar 105 and the further pillar 105. Moreover, the yoke device 101 comprises the longitudinal beam 117 wherein on the opposite side of the upper and lower bracket device 102, 103 a further upper bracket device 201 and a further lower bracket device 202 may be installed. Thus, a further fixing region with the blade 104 may be provided so that a more stable lifting of the blade 104 may be provided.

The upper bracket device 102 comprises an aperture to which a shell 112 may be mounted. The shell 112 and/or the aperture of the upper bracket device 102 may comprise a similar shape as the trailing edge 113 of the blade 104. Next, in the open position of the lower bracket device 103, the system 100 may be driven by a crane in a direction to the blade 104. The blade 104 may be inserted through the open position of the lower bracket device 103 into the shell 112 of the upper bracket device 102. When the blade 104 is positioned in a form closed contact with the shell 112 of the upper bracket device 102, the first lower bracket element 106 and the second lower bracket element 107 of the lower bracket device 103 moves into the closed position for providing e.g. a clamp fitting for holding the blade 104. The movement of the first lower bracket element 106 and the second lower bracket element 107 may be controlled by a pin/guiding slot 109 connection between the bracket connection element 116 and the pillar connection element 108. As can be taken from FIG. 2, the controller 203 may be installed to the longitudinal beam 117 of the yoke device 101.

Figure 3:
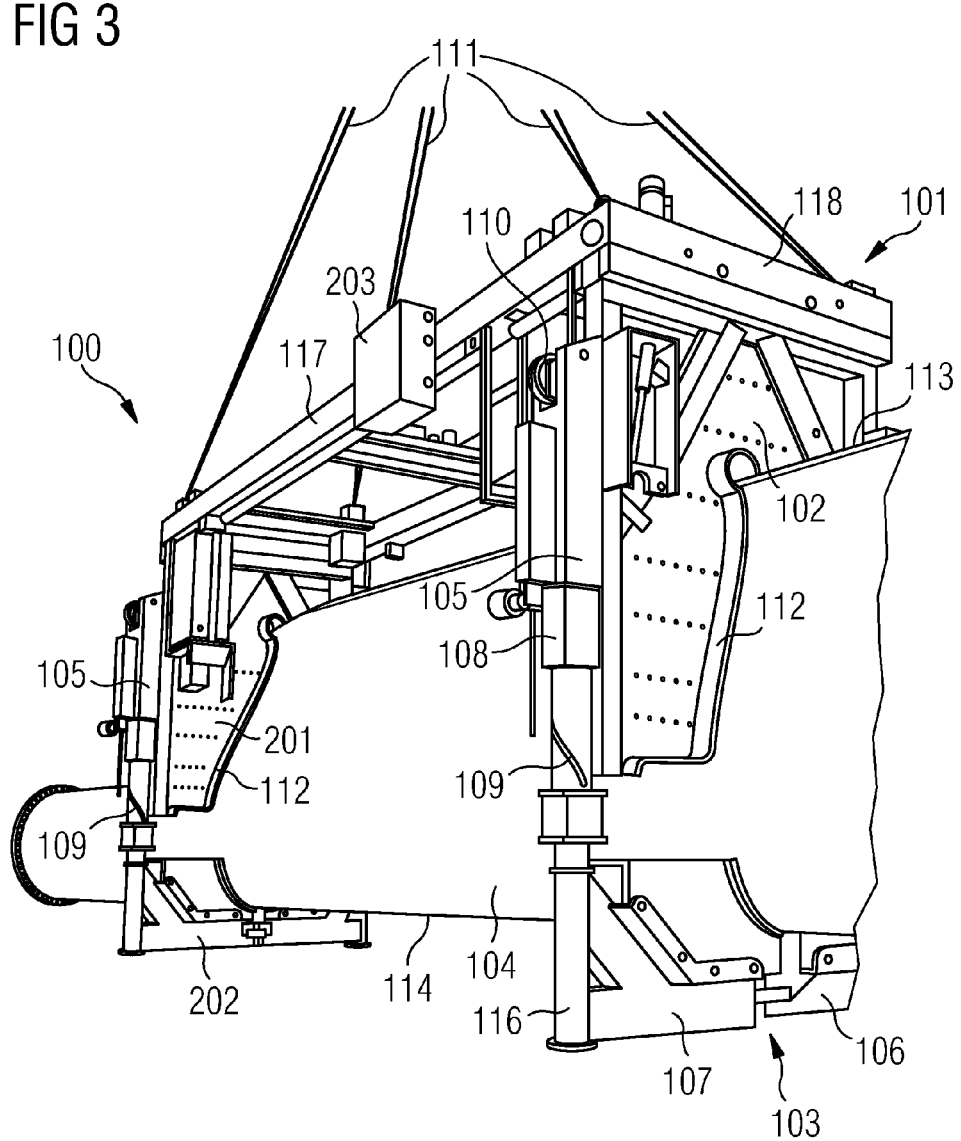
FIG. 3 illustrates a schematical view of the system wherein the lower bracket device is in a closed position according to an exemplary embodiment of the present invention.

FIG. 3 illustrates the system 100 for lifting the blade 104 wherein the lower bracket device 103 is in the closed position. The first lower bracket element 106 and the second lower bracket element 107 of the lower bracket device 103 are in a closed position and thereby holding the leading edge 114 of the blade 104.

As can be seen in FIG. 3 the guiding slot 109 provides a first section that is parallel to the pillar 105 and in a second section the guiding slot 109 is curved or helical around the pillar 105. When lowering the bracket connection element 116 of first or second lower bracket element 106, 107 the first and second lower bracket element 106 first moves parallel with the pillar 105 and when the pin reaches the second helical section of the guiding slot 109 the first and second lower bracket element 106, 107 pivots around the pillar 105 until the opening position of the lower bracket device 103 is reached. The actuator 110 may merely exert a driving force in a longitudinal direction to the pillar 105. The driving force may be transferred to the bracket connection element 116 by a driving wire or a threaded spindle, for example.

The actuator 110 may be a driven rope pulley for instance that drives the driving wire along the pillar 105, wherein the driving wire may be connected to the bracket connection element 116.

Moreover, the yoke device 101 as shown in FIG. 3 further comprises the further upper bracket device 201 and the further lower bracket device 202 that provides a first holding point for the blade 104. Thus, when the centre of gravity of the blade 104 is between the upper bracket device 102 and the lower bracket device 103 and the further upper and lower bracket device 201, 202 a stable lifting of the system 100 and of the blade 104 may be provided without causing rotational moment.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

LIST OF REFERENCE SIGNS 100 system for lifting a blade
101 yoke device
102 upper bracket device
103 lower bracket device
104 blade
105 pillar
106 first lower bracket element
107 second lower bracket element
108 pillar connection element
109 guiding slot
110 actuator 111 crane connection
112 shell
113 trailing edge
114 leading edge
115 safety pin
116 bracket connection element
117 longitudinal beam
118 cross beam
200 crane
201 further upper bracket device
202 further lower bracket device
203 controller

The invention claimed is:

1. A system for lifting a blade of a wind turbine, comprising:
   a yoke device adapted for being lifted by a crane;
   an upper bracket device; and
   a lower bracket device,
   wherein the upper bracket device and the lower bracket device are mounted to the yoke device for holding the blade,
   wherein the upper bracket device is adapted for engaging a first section of the blade,
   wherein the lower bracket device is adapted for engaging a second section of the blade,
   wherein the lower bracket device is movably mounted to the yoke device in such a way that the blade is insertable into the system in an open position of the lower bracket device and that the blade is spatially fixed by both the upper bracket device and the lower bracket device in a closed position of the lower bracket device,
   wherein the yoke device comprises a pillar,
   wherein the lower bracket device is slidably mounted along the pillar,
   wherein the yoke device comprises a further pillar,
   wherein the lower bracket device comprises a first lower bracket element and a second lower bracket element, and
   wherein the first lower bracket element is pivotably mounted to the pillar and the second lower bracket element is pivotably mounted to the further pillar.

2. The system as claimed in claim 1, further comprising a safety pin,
   wherein the safety pin is adapted for fixing the first lower bracket element and the second lower bracket element in the closed position, and
   wherein the safety pin is detachable from the first lower bracket element or the second lower bracket element in the open position.

3. The system as claimed in claim 1,
   wherein the lower bracket device comprises a bracket connection element,
   wherein the pillar comprises a pillar connection element,
   wherein the bracket connection element is slidably and pivotally mounted to the pillar connection element, and
   wherein a siding motion and/or a pivotal motion of the bracket connection element with respect to the pillar connection element are correlated with each other by a pin engaging in a guiding slot.

4. The system as claimed in claim 1, wherein the upper bracket device and/or the lower bracket device is detachably mounted to the yoke device.

5. The system as claimed in claim 1, further comprising a controller and an actuator,
   wherein the actuator is mounted to the yoke device,
   wherein the actuator is adapted for driving the lower bracket device, and
   wherein the controller is adapted for controlling the actuator.

6. The system as claimed in claim 5,
   wherein the controller is mounted to the yoke device, and
   wherein the controller is adapted for being remote controlled.

7. The system as claimed in claim 1, further comprising a sensor, wherein the sensor is adapted for sensing a relative position of the yoke device, the upper bracket device and/or the lower bracket device with respect to the blade.

8. The system as claimed in claim 1, wherein the lower bracket device and the upper bracket device comprises a shell that is adapted to a shape of a region of the blade.

9. The system as claimed in claim 1, further comprising a further upper bracket device, and
   a further lower bracket device,
   wherein the further upper bracket device and the further lower bracket device are mounted to the yoke device for holding the blade at a different region of the blade with respect to the upper bracket device and the lower bracket device.

10. A method for lifting a blade of a wind turbine having a system comprising a yoke device, a lower bracket device mounted to the yoke device, and an upper bracket device mounted to the yoke device, the method comprising the steps of:
    moving the lower bracket device into an open position for inserting the blade into the system;
    spatially fixing a first section of the blade by the upper bracket device; and
    moving the lower bracket device into a closed position for spatially fixing a second section of the blade by the lower bracket device so that the blade is held both by the upper bracket device and the lower bracket device;
    pivotably mounting a first lower bracket element of the lower bracket device to a pillar of the yoke device; and
    pivotably mounting a second lower bracket element of the lower bracket device to a further pillar of the yoke device.

11. The method as claimed in claim 10, further comprising lifting the yoke device by a crane.

12. The method as claimed in claim 10, further comprising:
    sensing a relative position of the yoke device, the upper bracket device and/or the lower bracket device with respect to the blade, and
    controlling the relative position by a controller.

* * * * *